United States Patent
Kline et al.

(10) Patent No.: US 11,029,761 B2
(45) Date of Patent: Jun. 8, 2021

(54) CONTEXT BASED GESTURE CONTROL

(71) Applicant: INTERNATIONAL BUSINESS MACHINES CORPORATION, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 64 days.

(21) Appl. No.: 16/052,667

(22) Filed: Aug. 2, 2018

(65) Prior Publication Data

US 2020/0042093 A1 Feb. 6, 2020

(51) Int. Cl.
G06F 3/01 (2006.01)
G06K 9/00 (2006.01)
G06K 9/72 (2006.01)
G06F 16/22 (2019.01)

(52) U.S. Cl.
CPC .............. *G06F 3/017* (2013.01); *G06F 16/22* (2019.01); *G06K 9/00288* (2013.01); *G06K 9/00355* (2013.01); *G06K 9/72* (2013.01)

(58) Field of Classification Search
None
See application file for complete search history.

(56) References Cited

U.S. PATENT DOCUMENTS

| 8,705,872 | B2 | 4/2014 | Ivanich et al. |
| 9,164,579 | B2 | 10/2015 | Im et al. |
| 9,582,737 | B2 | 2/2017 | Forutanpour et al. |
| 10,528,145 | B1* | 1/2020 | Zhang ................. G06K 9/00355 |
| 2011/0154266 | A1 | 6/2011 | Friend et al. |
| 2012/0226981 | A1* | 9/2012 | Clavin ..................... G06F 3/005 715/719 |
| 2013/0300644 | A1* | 11/2013 | Chen ........................ G06F 3/017 345/156 |
| 2014/0218283 | A1* | 8/2014 | Choi ........................ G06F 3/017 345/156 |
| 2014/0218517 | A1* | 8/2014 | Kim ..................... H04L 12/2818 348/143 |

(Continued)

FOREIGN PATENT DOCUMENTS

WO 2017147892 A1 9/2017

OTHER PUBLICATIONS

Mel, Peter et al. "The NIST Definition of Cloud Computing—Recommendations of the National Institute of Standards and Technology", Special Publication 800-145, Sep. 2011; 7 pgs.

*Primary Examiner* — Amare Mengistu
*Assistant Examiner* — Sarvesh J Nadkarni
(74) *Attorney, Agent, or Firm* — Cantor Colburn LLP; Tihon Poltavets

(57) ABSTRACT

Methods, systems and computer program products for operating smart devices using context based gesture control are provided. Aspects include observing, via a first device, a first user making a first gesture and a second gesture and identifying, by a processor, an intended device based at least in part on the first gesture. Aspects also include identifying, by the processor, an intended action for the intended device based at least in part on the second gesture. Aspects further include instructing, by the processor, the intended device to perform the intended action.

14 Claims, 6 Drawing Sheets

(56) References Cited

U.S. PATENT DOCUMENTS

| | | | |
|---|---|---|---|
| 2015/0078613 A1* | 3/2015 | Forutanpour | G06F 3/017 |
| | | | 382/103 |
| 2015/0131855 A1* | 5/2015 | Hanzawa | G06K 9/00288 |
| | | | 382/103 |
| 2017/0177383 A1 | 6/2017 | Sa et al. | |
| 2017/0300170 A1 | 10/2017 | Hinckley et al. | |
| 2018/0018081 A1* | 1/2018 | Dattilo-Green | H04L 67/025 |
| 2018/0095616 A1* | 4/2018 | Valdivia | H04L 51/24 |

\* cited by examiner

CONTEXT BASED GESTURE CONTROL

BACKGROUND

The invention relates generally to operating smart devices via gesture control and, more specifically, to operating smart devices using context based gesture control.

Smart devices are becoming more common in the household and these devices can often be controlled via gestures made by users. In many cases, the same type of gesture can be used to control various devices. For example, changing a cooking mode of a microwave oven, change the washing mode in dish washer, and changing the speed of fan etc., may all rely on similar types of gestures from users. This can result in a user making a gesture to change the operation of a first device and inadvertently activating or change in the operation of a second device.

SUMMARY

According to an embodiment, a system for operating smart devices using context based gesture control is provided. The system includes a memory having computer readable computer instructions, and a processor for executing the computer readable instructions. The computer readable instructions include instructions for observing, via a first device, a first user making a first gesture and a second gesture. The computer readable instructions also include instructions for identifying, by a processor, an intended device based at least in part on the first gesture and identifying, by the processor, an intended action for the intended device based at least in part on the second gesture. The computer readable instructions further include instructions fir instructing, by the processor, the intended device to perform the intended action.

According to another embodiment, a method for operating smart devices using context based gesture control is provided. The method includes observing, via a first device, a first user making a first gesture and a second gesture. The method also includes identifying, by a processor, an intended device based at least in part on the first gesture and identifying, by the processor, an intended action for the intended device based at least in part on the second gesture. The method further includes instructing, by the processor, the intended device to perform the intended action.

According to a further embodiment, a computer program product is provided. The computer program product includes a computer readable storage medium having program instructions embodied therewith. The computer readable storage medium is not a transitory signal per se. The program instructions are executable by a computer processor to cause the computer processor to perform a method. The method includes observing, via a first device, a first user making a first gesture and a second gesture. The method also includes identifying, by a processor, an intended device based at least in part on the first gesture and identifying, by the processor, an intended action for the intended device based at least in part on the second gesture. The method further includes instructing, by the processor, the intended device to perform the intended action.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, in which:

DETAILED DESCRIPTION

Figure 1:
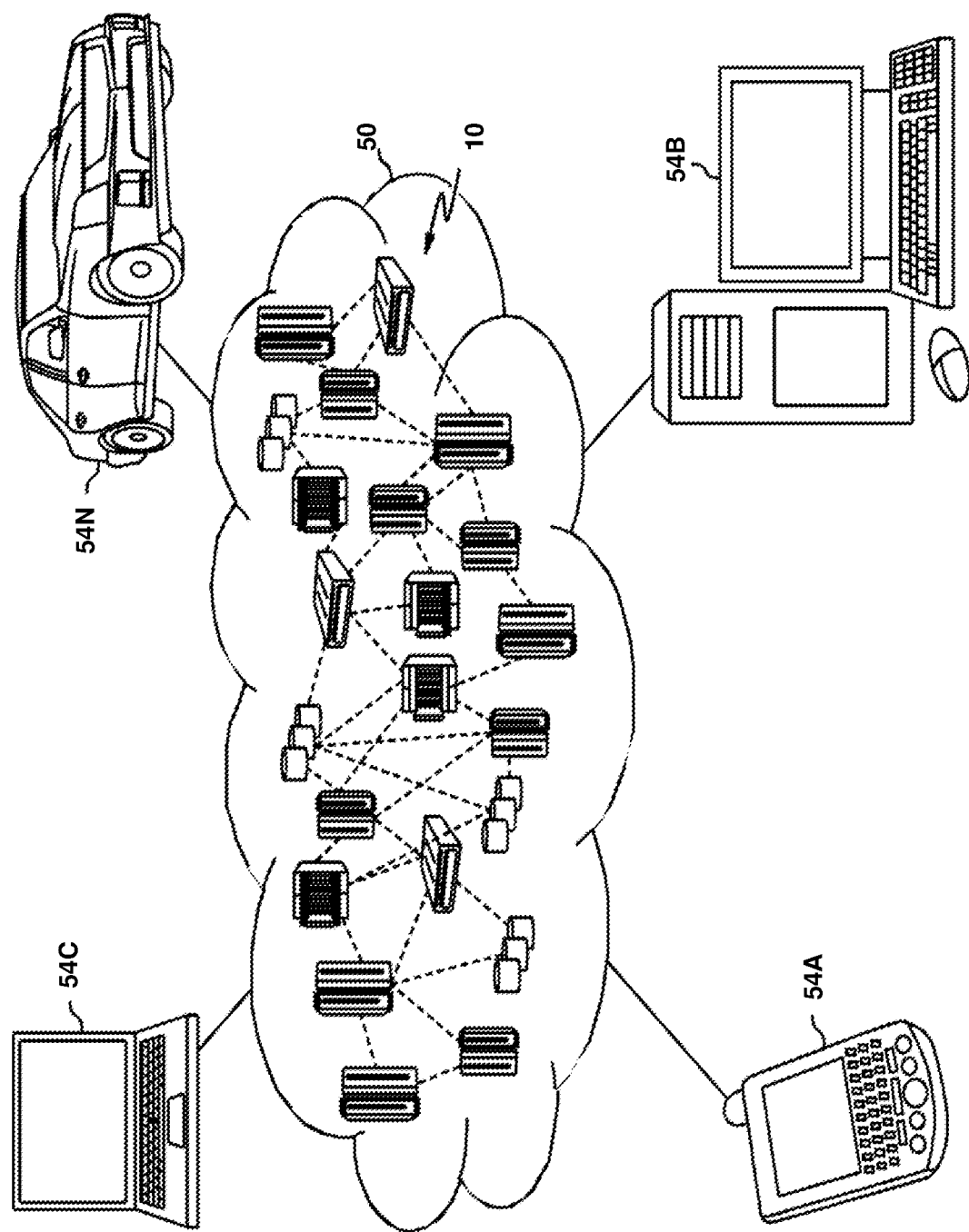
FIG. 1 depicts a cloud computing environment according to one or more embodiments of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist, on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist, on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
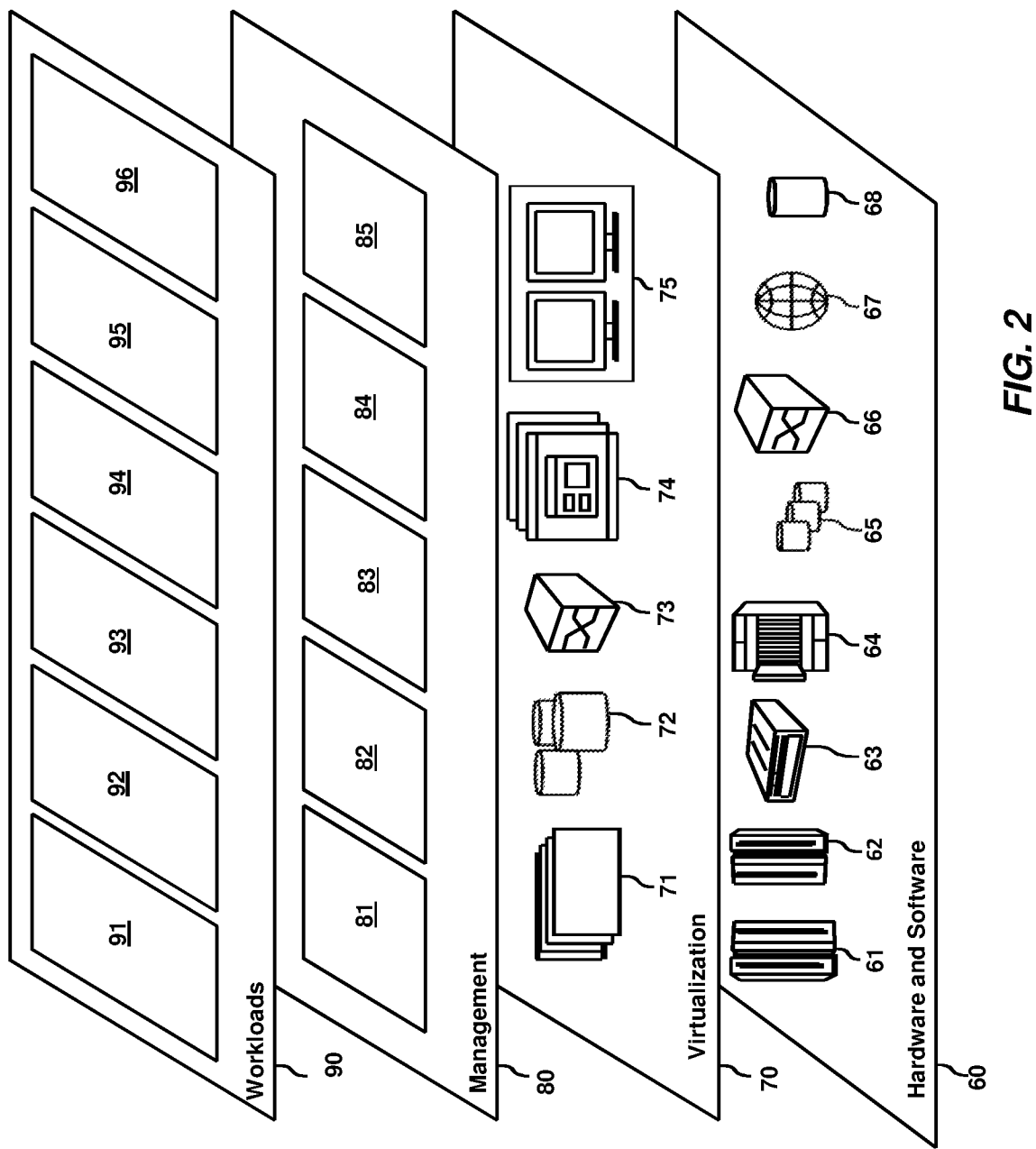
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and operating smart devices using context based gesture control 96.

Figure 3:
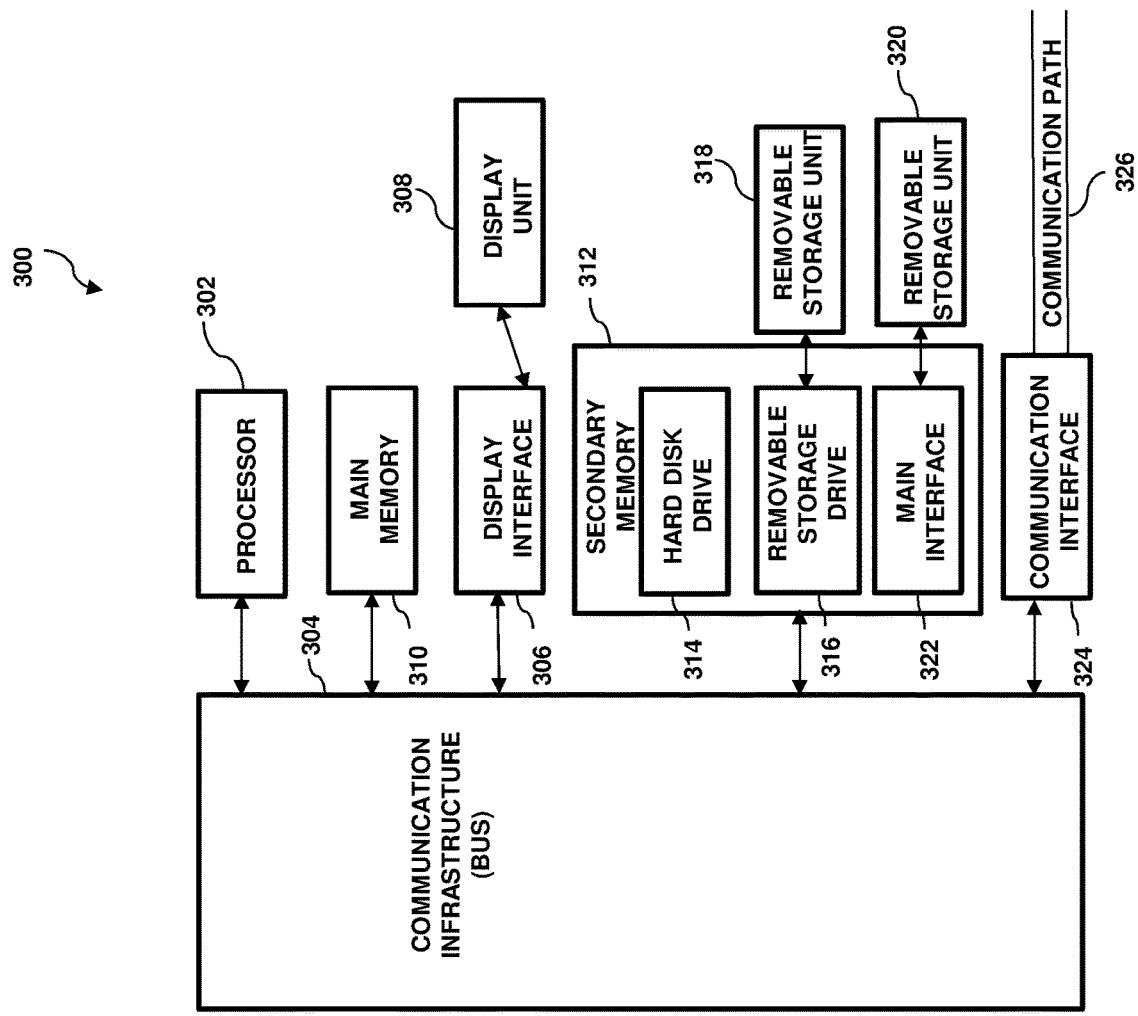
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

In exemplary embodiments, a system for operating smart devices using context based gesture control is provided. In exemplary embodiments, a first user device monitors the movements of users and identifies a first and second gesture made by a user. Based on the identified gestures, the first user device instructs an intended device, identified at least based on the first gesture, to take an intended action, identified at least based on the second gesture. The identification of the intended device and action can be further based on one or more of an identity of the user making the gestures, one or more environmental conditions of the first user device, one or more characteristics of the user, and an operation state of one or more smart devices in communication with the first device.

For example, a first user device may observe a first user pointing at his ear with his left hand and pointing upward with his right hand. The first user device also knows that the first user is watching a television at the time the gestures were observed. Accordingly, the first user device can instruct the television to increase the volume of the television. In another example, the first user device may observe a first user pointing at his ear with his left hand and pointing upward with his right hand. The first user device also knows that the first user is listening to music with a smart speaker at the time the gestures were observed. Accordingly, the first user device can instruct the smart speaker to increase the volume of the music.

Figure 4:
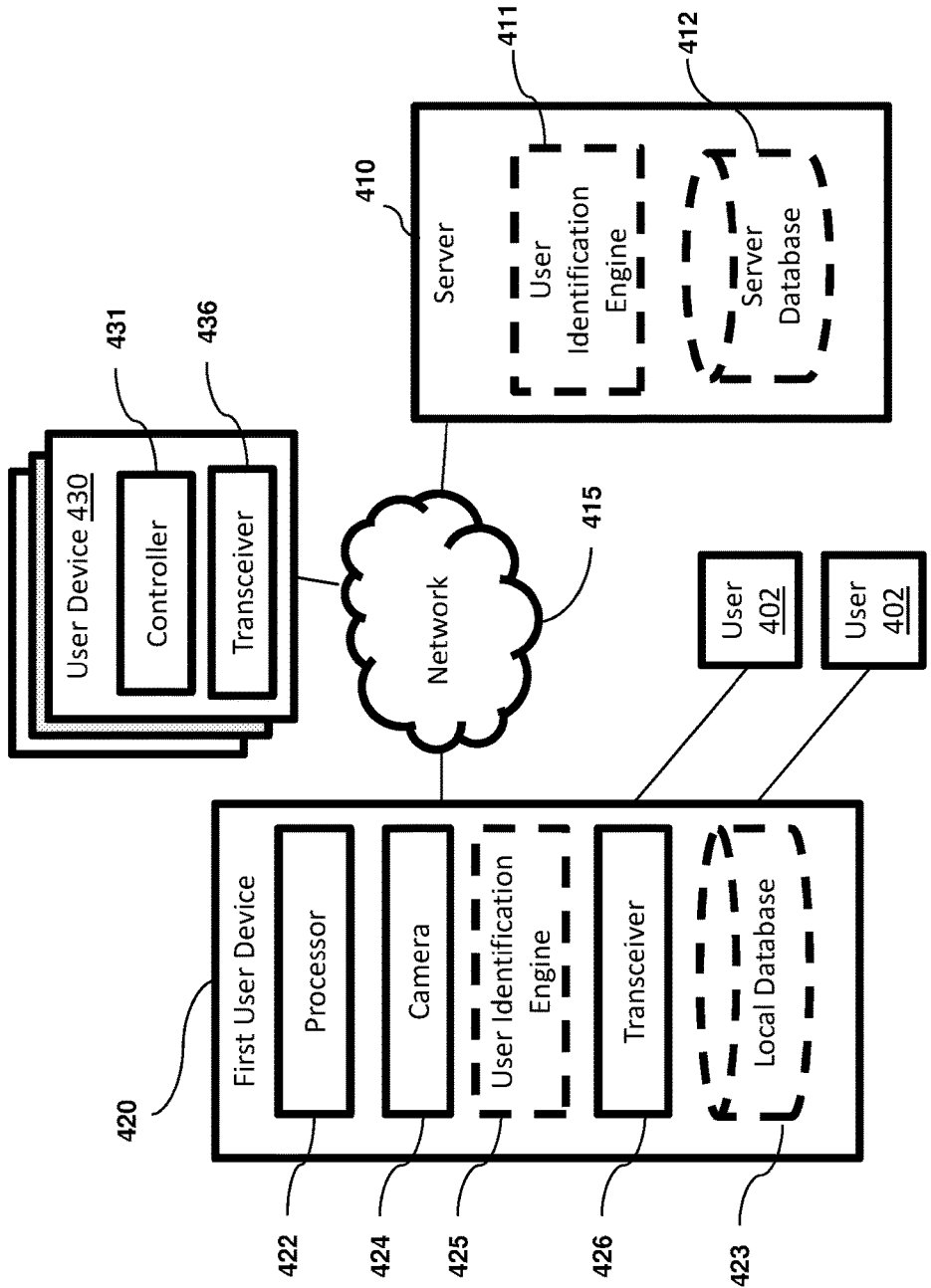
FIG. 4 depicts a system upon which operating smart devices using context based gesture control may be implemented according to one or more embodiments of the present invention.

Turning now to FIG. 4, a system 400 upon which operating smart devices using context based gesture control may be implemented will now be described in accordance with an embodiment. The system 400 includes a server 410 in communication with a first user device 420 and one or more other user device(s) 430 via a communications network 415. The communications network 415 may be one or more of, or a combination of, public (e.g., Internet), private (e.g., local area network, wide area network, virtual private network), and may include wireless and wireline transmission systems (e.g., satellite, cellular network, terrestrial networks, etc.). The first user device 420 is configured to observe gestures made by one or more users 402 in range of the first user device 420.

In exemplary embodiments, the first user device 420 can be a smartphone, a tablet, a computer system such as the one shown in FIG. 3, a smart speaker, a television, or any other suitable electronic device. The first user device 420 includes a processor 422, a camera 424 and a transceiver 426. Optionally, the first user device 420 can also include a local database 423 and a user identification engine 425. The camera 424 is used to observe users 402 in the range of the first user device 420. The processor 422 receives video from the camera 424 and analyzes the video to identify gestures made by the users 402. In exemplary embodiments, the local database 423 is configured to store images of known users 402 of the first user device 420 and to store correlations between the gestures of the users 402 and user devices 430. The user identification engine 425 can include a facial recognition engine that is configured to compare the received image of a user to stored images in the local database 423. The first user device 420 can also include a user interface, such as a touchscreen, a keyboard, or the like, that can be used to create associations between gestures and user devices 430.

In various embodiments, the images of known users of the first user device 420 can be stored in the local database 423 and/or the server database 412. Likewise, the identification of a user can be performed by the user identification engine 425 of the first user device 420 or by the user identification engine 411 of the server 410. The server 410 can be implemented as a computer system such as the one shown in FIG. 3 or as a cloud based system such as the one shown in FIGS. 1 & 2. In embodiments where the server 410 is configured to perform user identification and to store images of the users, the user device 420 is configured to capture audio files and/or images of the users and to transmit them to the server 410.

In exemplary embodiments, the first user device 420 is in communication with a plurality of other user device(s) 430 via transceivers 426, 436 and network 415. The first user device 420 is configured to instruct the controller 431 of a user device 430 to take specific action. In exemplary embodiments, the user devices 430 can include any smart device that is capable of communicating with the first user device, such as a thermostat, a light controller, a smart television, a smart speaker, a security system, a smart appliance such as an oven, or the like. The controller 431 of the user device 430 is configured to control the operation of the user device 430 and to provide information regarding the user device 430, including its operational state, to the first user device 420. In one embodiment, the first user device 420 can be identified as the intended device.

In exemplary embodiments, machine learning can be used to create the database of stored gestures and associated intended devices and actions. The database includes associations between the identity of the user, the type of gestures, the environmental conditions and the state of the connected user devices, which are all used in combination to determine what actions should be taken by which devices based on the observed gestures. Based on the observed gestures made by a user, historical patterns, the relative position and direction from any device, surrounding context etc., the first user device will identify an intended device to be controlled by any specific gesture. In one example, the first user device will analyze information from the surrounding and user's biometric data to derive the context or selection of the appropriate device. For example, if is determined that the user is sweating or feeling hot, the intended device will likely be an air conditioner. Using machine learning methods, the selection of the intended device can be mapped with user identity, environmental conditions, date and time, so that the same gestures can control different devices under different conditions.

Figure 5:
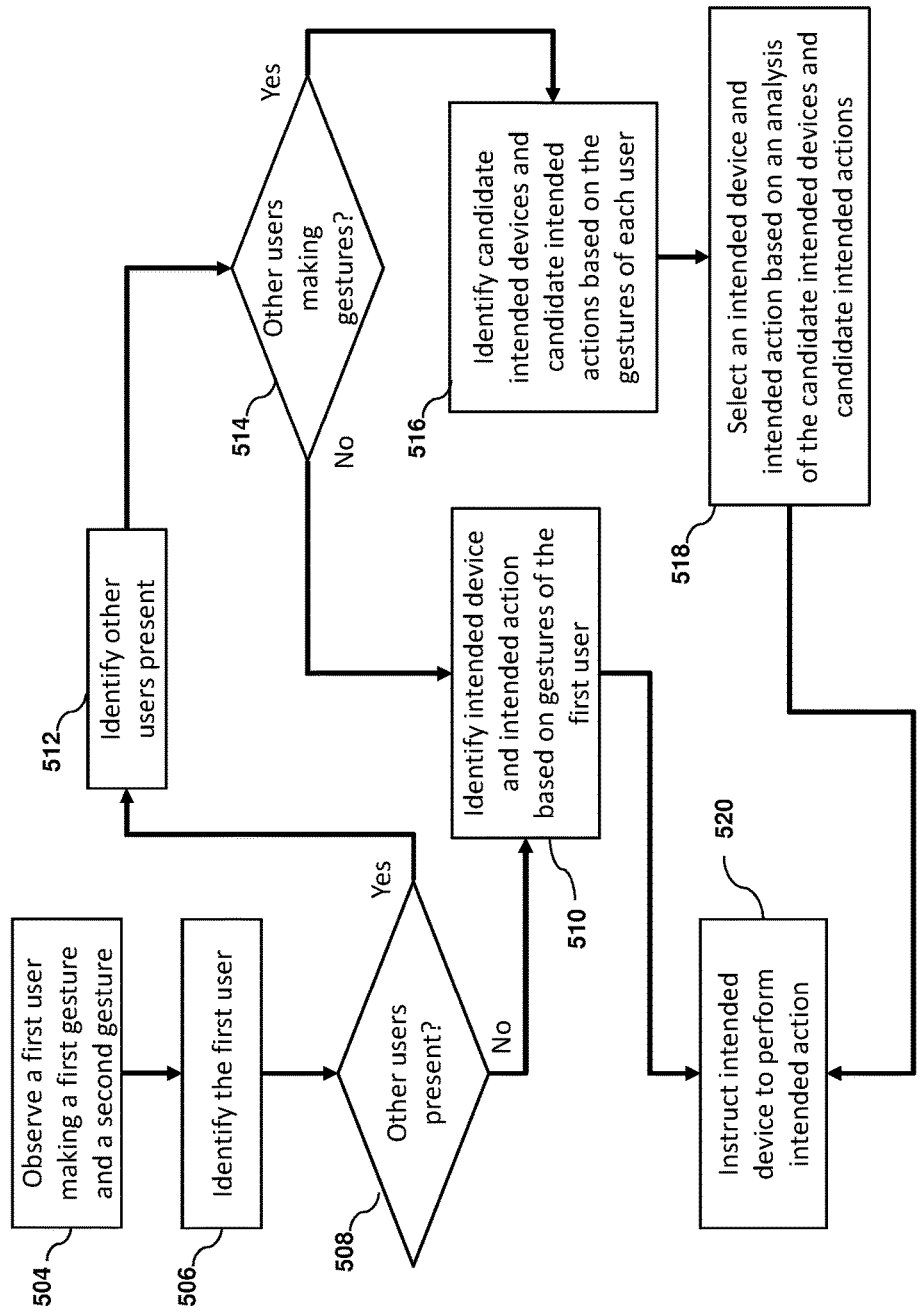
FIG. 5 depicts a flow diagram of a method for operating smart devices using context based gesture control according to one or more embodiments of the present invention.

Turning now to FIG. 5, a flow diagram of a method 500 for operating smart devices using context based gesture control in accordance with an embodiment is shown. The method 500 begins at block 504 and observes a first user making a first gesture and a second gesture. Next, as shown at block 506, the method 500 includes identifying the first user. In one embodiment, the first user is identified using facial recognition software to compare images of known users to the first user. The method 500 also includes determining if other users are present, as shown at decision block 508. If no other users are present, the method 500 proceeds to block 510 and identifies the intended device and intended action based, at least in part, on the gestures of the first user. The intended device and action can be further identified based on an identity of the first user, environmental conditions, and the state of the connected user devices. If other users are present, the method 500 proceeds to block 512 and identifies the other users present.

Next, as shown at decision block 514, the method 500 includes determining if the other users present are making gestures. If the other users present are not making gestures, the method 500 proceeds to block 510. Otherwise, the method 500 proceeds to block 516 and identifies a candidate intended device and candidate intended action based on the gestures of each user. Next, as shown at block 518, the method 500 includes selecting an intended device and intended action based on an analysis of the candidate intended devices and candidate intended actions. In one embodiment, the intended device and intended action and selected based on the mostly commonly requested action by the users. For example, if two users are requesting that the volume be turned up and one user is requesting that the channel be changed, the system will increase the volume and not change the channel. In another embodiment, the intended device and intended action and selected based on a hierarchy of the users. For example, if two users are watching television and a first user requests that the volume be increased and a second user requests that the volume be turned down, the system will identify which user's commands to follow based on a stored hierarchy of the users. Once the intended device and intended action are selected, the method 500 concludes at block 520 by instructing the intended device to perform the intended action.

Figure 6:
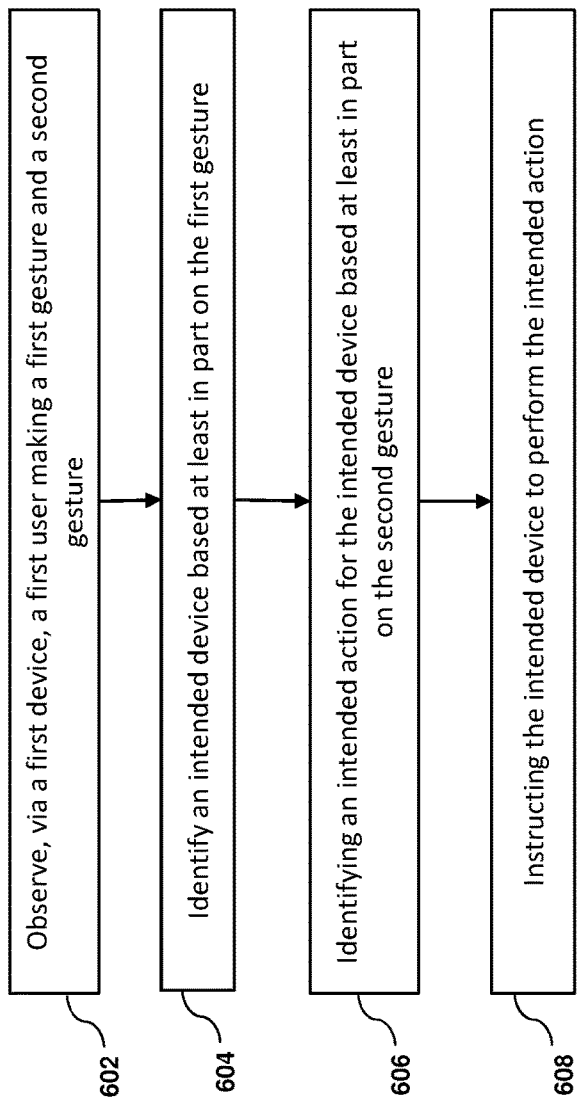
FIG. 6 depicts a flow diagram of another method for operating smart devices using context based gesture control according to one or more embodiments of the present invention.

Turning now to FIG. 6, a flow diagram of a method 600 for operating smart devices using context based gesture control in accordance with an embodiment is shown. As shown at block 602, the method 600 includes observing, via a first device, a first user making a first gesture and a second gesture. In exemplary embodiments, the first user device includes a camera configured to capture video of an area around the first user device and a processor configured to analyze the video to identify gestures made by nearby individuals. In one embodiment, the first gesture is made with a first hand of the first user and the second gesture is made with a second hand of the first user. In another embodiment, the first gesture is made with a first hand of the first user and the second gesture is made with a first hand of the first user after the first gesture. In one embodiment, the first gesture includes the first user pointing at the intended device.

Next, as shown at block 604, the method 600 includes identifying an intended device based at least in part on the first gesture. The method 600 also includes identifying an intended action for the intended device based at least in part on the second gesture, as shown at block 606. In one embodiment, the method includes obtaining, via the first device, one or more environmental conditions and the identification of the intended device and the intended action are further based at least in part on one or more environmental conditions. In one embodiment, the method includes identifying the first user by the processor and the identification of the intended device and the intended action are further based at least in part on the identity of the first user. In another embodiment, the identification of the intended device and the intended action are further based at least in part on an operational state of one or more smart devices in communication with the first device. The method 600 also includes instructing, by the processor, the intended device to perform the intended action, as shown at block 608.

In exemplary embodiments, identifying the intended device and the intended action is performed by obtaining a user action database that stores relationships between gestures and intended devices and actions for a plurality of users. The user action database also includes data relating to the identity of the users, the environmental conditions, and the operation state of one or more smart devices in communication with the first device.

In one embodiment, the second gesture can be analyzed to identify a quantity associated with the intended action based at least in part on the second gesture. For example, if a user is requesting an increase in volume by simulating the turning of a knob in a clock wise direction, the degree of the simulated turn can be analyzed to determine how much of an increase the user desires.

Technical benefits include an improved user experience in operating smart devices using gesture controls that analyzes multiple gestures made by a user to identify an intended device and an intended action. In addition, machine learning can be used to learn associations between gestures made by users and the intended device/action. The identification of the intended device/action can be further based on environmental and contextual information observed by one or more smart devices.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for operating smart devices using context based gesture control, comprising:
    observing, via a first device, a first gesture and a second gesture performed by a first user, wherein the first gesture is made with a first hand of the first user and the second gesture is made with a second hand of the first user;
    identifying, by a processor, a first intended device based at least in part on the first gesture, wherein the first gesture includes the first user pointing at the first intended device;
    identifying, by the processor, a first intended action to be performed by the first intended device based at least in part on the second gesture;
    observing, via the first device, a third gesture and a fourth gesture performed by a second user, wherein the third gesture is made with a first hand of the second user and the third gesture is made with a second hand of the second user;
    identifying, by the processor, a second intended device based at least in part on the third gesture, wherein the third gesture includes the second user pointing at the second intended device;
    identifying, by the processor, a second intended action to be performed by the second intended device based at least in part on the fourth gesture;
    obtaining, by the processor, a hierarchy of users;
    instructing, by the processor, the first intended device to perform the first intended action based on a determination that the first user has a higher priority than the second user in the hierarchy of users; and
    instructing, by the processor, the second intended device to perform the second intended action based on a determination that the second user has a higher priority than the first user in the hierarchy of users.

2. The method of claim 1, wherein identifying the first intended device and the first intended action is performed by obtaining a user action database that stores relationships between gestures and first intended devices and actions for a plurality of users.

3. The method of claim 1, further comprising identifying the first user by the processor and wherein the identification of the first intended device and the first intended action are further based at least in part on the identity of the first user.

4. The method of claim 1, further composing obtaining, via the first device, one or more environmental conditions and wherein the identification of the first intended device and the first intended action are further based at least in part on one or more environmental conditions.

5. The method of claim 1, wherein the identification of the first intended device and the first intended action are further based at least in part on an operation state of one or more smart devices in communication with the first device.

6. The method of claim 1, wherein the first device includes a camera, a transceiver, and the processor and wherein the first intended device is in communication with the first device and includes a controller configured to perform the first intended action.

7. A system for operating smart devices using context based gesture control, comprising:
a memory having computer readable instructions; and
a processor for executing the computer readable instructions, the computer readable instructions including instructions for:
observing, via a first device, a first user making a first gesture and a second gesture;
identifying, by a processor, a first intended device based at least in part on the first gesture, wherein the first gesture includes the first user pointing at the first intended device and wherein the first gesture is made with a first hand of the first user and the second gesture is made with a second hand of the first user;
identifying, by the processor, a first intended action for the first intended device based at least in part on the second gesture;
observing, via the first device, a third gesture and a fourth gesture performed by a second user, wherein the third gesture is made with a first hand of the second user and the third gesture is made with a second hand of the second user;
identifying, by the processor, a second intended device based at least in part on the third gesture, wherein the third gesture includes the second user pointing at the second intended device;
identifying, by the processor, a second intended action to be performed by the second intended device based at least in part on the fourth gesture;
obtaining, by the processor, a hierarchy of users;
instructing, by the processor, the first intended device to perform the first intended action based on a determination that the first user has a higher priority than the second user in the hierarchy of users; and
instructing, by the processor, the second intended device to perform the second intended action based on a determination that the second user has a higher priority than the first user in the hierarchy of users.

8. The system of claim 7, wherein identifying the first intended device and the first intended action is performed by obtaining a user action database that stores relationships between gestures and first intended devices and actions for a plurality of users.

9. The system of claim 7, wherein the computer readable instructions further include instructions for:
identifying the first user by the processor and wherein the identification of the first intended device and the first intended action are further based at least in part on the identity of the first user.

10. The system of claim 7, wherein the computer readable instructions further include instructions for:
obtaining, via the first device, one or more environmental conditions and wherein the identification of the first intended device and the first intended action are further based at least in part on one or more environmental conditions.

11. The system of claim 7, wherein the identification of the first intended device and the first intended action are further based at least in part on an operation state of one or more smart devices in communication with the first device.

12. The system of claim 7, wherein the first device includes a camera, a transceiver, and the processor and wherein the first intended device is in communication with the first device and includes a controller configured to perform the first intended action.

13. A computer program product comprising a computer readable storage medium having program instructions embodied therewith the program instructions executable by a computer processor to cause the computer processor to perform a method, comprising:
observing, via a first device, a first user making a first gesture and a second gesture;
identifying, by a processor, a first intended device based at least in part on the first gesture, wherein the first gesture includes the first user pointing at the first intended device and wherein the first gesture is made with a first hand of the first user and the second gesture is made with a second hand of the first user;
identifying, by the processor, a first intended action for the first intended device based at least in part on the second gesture;
observing, via the first device, a third gesture and a fourth gesture performed by a second user, wherein the third gesture is made with a first hand of the second user and the third gesture is made with a second hand of the second user;
identifying, by the processor, a second intended device based at least in part on the third gesture, wherein the third gesture includes the second user pointing at the second intended device;
identifying, by the processor, a second intended action to be performed by the second intended device based at least in part on the fourth gesture;
obtaining, by the processor, a hierarchy of users;
instructing, by the processor, the first intended device to perform the first intended action based on a determination that the first user has a higher priority than the second user in the hierarchy of users; and
instructing, by the processor, the second intended device to perform the second intended action based on a determination that the second user has a higher priority than the first user in the hierarchy of users.

14. The computer program product of claim 13, wherein the method further comprises identifying the first user by the processor and wherein the identification of the first intended device and the first intended action are further based at least in part on the identity of the first user.

* * * * *